F. R. SILLS.
POWER SHOVEL.
APPLICATION FILED JAN. 14, 1919.

1,337,332.

Patented Apr. 20, 1920.

Inventor
Frederick R. Sills.
by Herbert W. Jenner
Attorney

UNITED STATES PATENT OFFICE.

FREDERICK R. SILLS, OF ELMWOOD, NORTH CAROLINA, ASSIGNOR OF ONE-HALF TO CAROLINA MOTOR COMPANY, OF STATESVILLE, NORTH CAROLINA, A CORPORATION OF NORTH CAROLINA.

POWER-SHOVEL.

1,337,332.   Specification of Letters Patent.   Patented Apr. 20, 1920.

Application filed January 14, 1919. Serial No. 271,027.

*To all whom it may concern:*

Be it known that I, FREDERICK R. SILLS, a citizen of the United States, residing at Elmwood, in the county of Iredell and State of North Carolina, have invented certain new and useful Improvements in Power-Shovels, of which the following is a specification.

This invention relates to power operated shovels principally used in road making and specially adapted for shoveling top soil; and it consists in the novel construction and combination of the parts hereinafter fully described and claimed.

Figure 1:
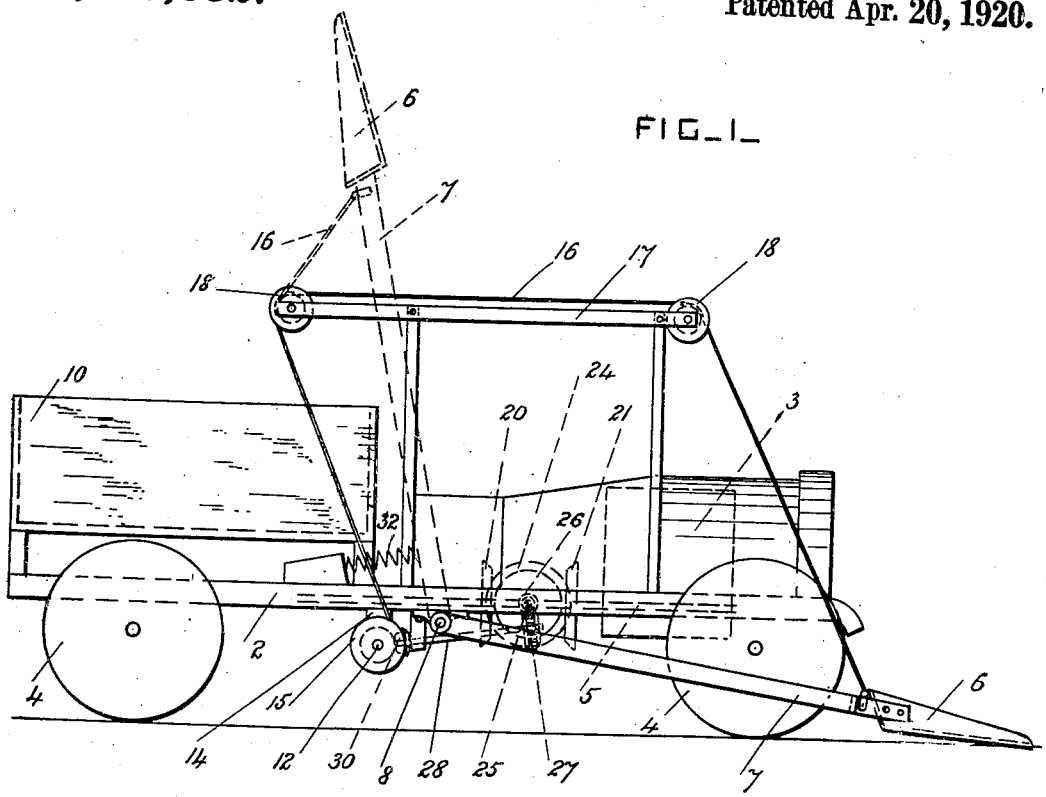
Figure 2:
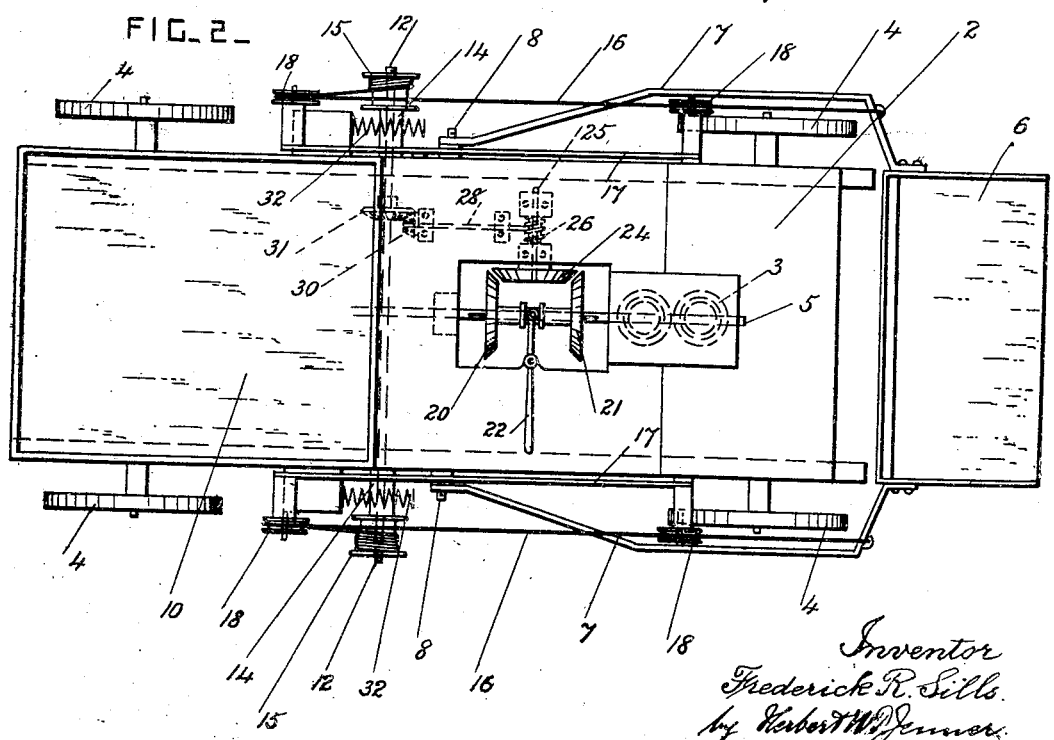

In the drawings, Figure 1 is a side view of a power shovel constructed according to this invention. Fig. 2 is a plan view of the same.

A motor car or automobile of any approved construction is used in carrying out this invention, and it has a frame 2, engine 3 and road wheels 4. The main driving shaft 5 of the engine is preferably arranged to run centrally and longitudinally in the frame, and the machinery for driving the car from the engine is not shown as it is of any approved sort.

A large shovel or scoop 6 is provided, and is secured to two arms 7 which are pivoted by a shaft or pins 8 to the frame of the car at about the middle of its length. These two arms are arranged one on each side of the car, and are long enough to project beyond its front end. The free end portions of the arms are secured to the end portions of the shovel which is large enough to extend across the end of the car frame. A receiving box or hopper 10 is supported by the frame, and is arranged to the rear of the pivots of the arms of the shovel.

A winding shaft 12 is journaled in bearings 14 arranged below the car frame a little to the rear of the shovel pivots, and it has winding barrels 15 secured one on each end portion of it. Flexible connections 16, such as cords or chains, are wound on the barrels 15, and are attached to the shovel or its arms.

A light frame or support 17 is provided and is secured to the car frame 2, and 18 are guide sheaves journaled in the frame 17, and supporting the intermediate portions of the flexible connections at suitable points above the car frame and engine. The rear guide sheaves are arranged a little to the rear of the pivot shaft or pivot pins 8.

The winding shaft 12 is driven from the engine shaft 5 by intermediate driving mechanism of approved construction. In the example shown, two friction driving wheels 20 and 21 are splined on the engine shaft, and are provided with any suitable means for sliding them longitudinally, such as a lever 22. A friction driven wheel 24 is arranged between the wheels 20 and 21, and it is secured on a shaft 25 journaled in the frame. A worm 26 is secured on the shaft 25, and gears into a worm wheel 27 secured on a countershaft 28 which is also journaled in the frame. A beveled toothed pinion 30 is secured on the countershaft 28, and gears into a beveled toothed wheel 31 secured on the winding shaft 12.

In operating the machine, the shovel is lowered into engagement with the ground as shown in full lines, and the car is moved forward slowly until the shovel is filled, the driven friction wheel 24 being out of engagement with either of the driving wheels. The driven wheel 24 is then revolved by contact with one of the driving wheels so as to wind up the flexible connections, and raise the shovel to the position shown in dotted lines in Fig. 1. The soil slides rearwardly off the shovel, and falls into the box 10. The motion of the winding mechanism is then reversed, so that the shovel is lowered to its original position.

Springs 32 are preferably secured to the car frame, and are arranged in the rearward path of the arms of the shovel. These springs are compressed by the arms, and they operate as buffers, and assist the return movement of the shovel until its arms have passed over the vertical center line of the pivot shaft or pivot pins.

What I claim is:

The combination, with a motor car, of arms pivoted to the middle part of the car frame, a shovel secured to the free end portions of the arms and adapted to engage with the ground in front of the car, a countershaft journaled longitudinally of the car frame, a worm wheel secured on the countershaft, a worm gearing into the said worm wheel, reversible intermediate driving devices operatively connecting the said worm with the driving motor of the car, a winding shaft journaled crosswise of the car frame, beveled toothed wheels connecting the countershaft with the winding shaft, winding barrels secured on the winding shaft and arranged one on each side of the car frame, front and rear guide sheaves supported above the front and middle portions of the car frame, the rear guide sheaves being arranged to the rear of the pivots of the said arms, and flexible connections wound on the winding barrels and passing over the guide sheaves and operating to raise the shovel so as to discharge its contents at the rear part of the motor car.

In testimony whereof I have affixed my signature.

FREDERICK R. SILLS.